United States Patent [19]

Buchanan, Jr. et al.

[11] Patent Number: 4,823,058

[45] Date of Patent: Apr. 18, 1989

[54] VEHICLE WINDOW WIPER WITH DUAL PAUSE

[75] Inventors: H. Charles Buchanan, Jr., Spring Valley; Richard E. Wainwright, Kettering, both of Ohio

[73] Assignee: General Motors Corporation, Detroit, Mich.

[21] Appl. No.: 222,689

[22] Filed: Jul. 21, 1988

[51] Int. Cl.$^4$ .............................................. B60S 1/08
[52] U.S. Cl. .................................. 318/443; 15/250.17;
318/DIG. 2
[58] Field of Search ................. 318/443, 444, DIG. 2;
15/250 C, 250.17

[56] References Cited

U.S. PATENT DOCUMENTS

| | | | |
|---|---|---|---|
| 4,271,381 | 6/1981 | Munz et al. | 318/444 X |
| 4,336,482 | 6/1982 | Goertler et al. | 318/261 X |
| 4,559,484 | 12/1985 | Hirano | 15/250.17 |
| 4,663,575 | 5/1987 | Juzswik et al. | 318/444 |

Primary Examiner—Bentsu Ro

Attorney, Agent, or Firm—Robert M. Sigler

[57] ABSTRACT

A vehicle window wiper control activates an electric motor to drive the wiper through repeating cycles of a wipe pattern on a vehicle window. In the pause mode, a first wiper position responsive switch provides a pause at both inner and outer wipe positions, one at each end of the wipe pattern. In the off mode, however, the final wipe cycle is completed through a second wiper position responsive switch which is open only in the inner wipe position and is connected in parallel with the first wiper position responsive switch to shunt it at the outer wipe position, so that the wiper is parked only in the inner wipe position. The wiper position responsive switches are multiple stationary contacts tracing circular paths of differing radii on a conducting plate with non-conducting portions which rotates with wiper movement. The division of total pause time into two pauses per wipe cycle allows a halving of the RC time constant in the pause timer, with cost and/or reliability benefits.

5 Claims, 1 Drawing Sheet

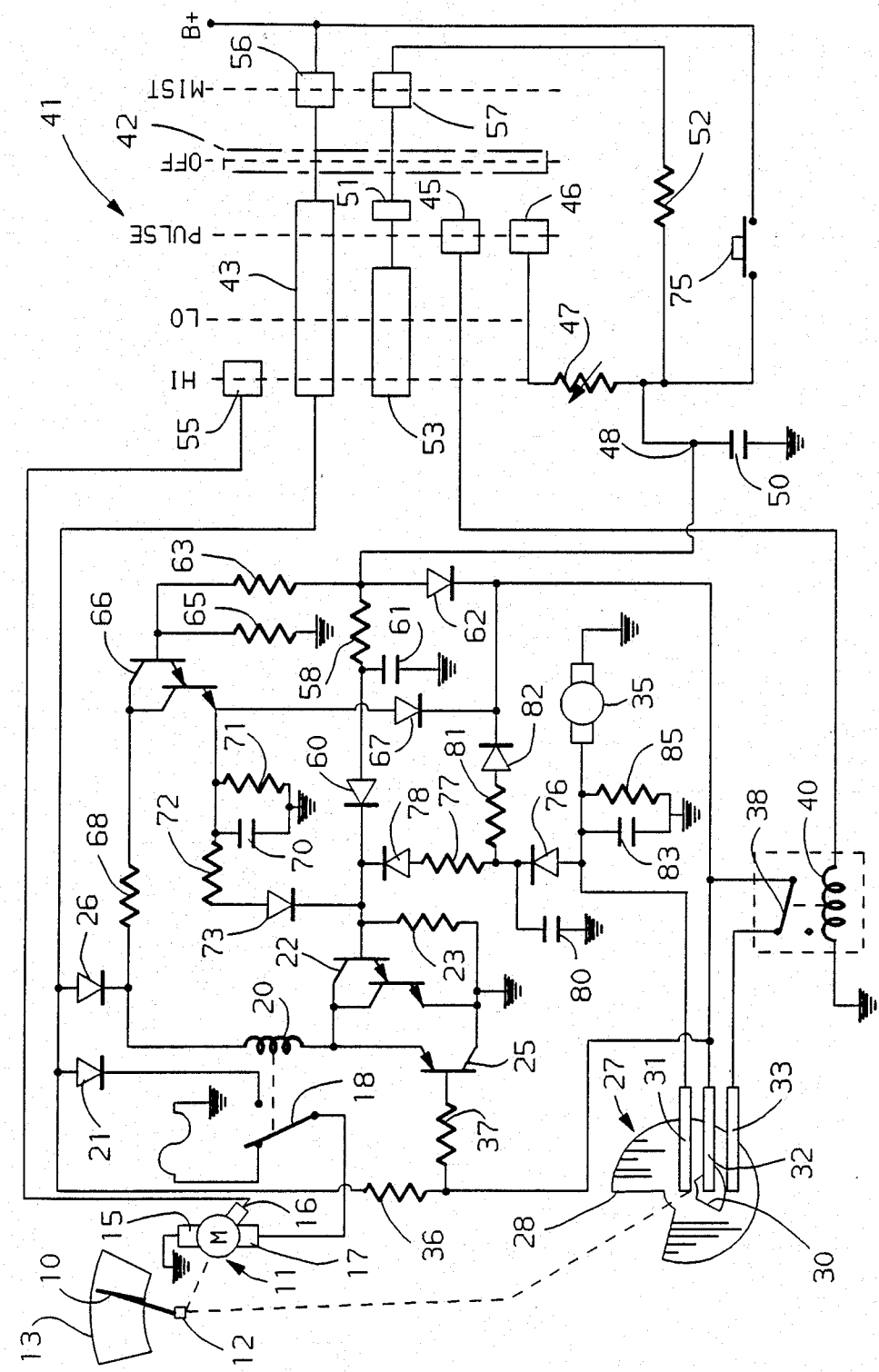

VEHICLE WINDOW WIPER WITH DUAL PAUSE

BACKGROUND OF THE INVENTION

This invention relates to a control for a motor vehicle window wiper of the type which pauses at a predetermined position in each wipe cycle. Wiper controls of this type are well known in the prior art to produce one such pause at one end of a wipe pattern for each wipe cycle, with the wiper sweeping across to the other end of the pattern and back between each two successive pauses.

However, in some applications, it might be preferable to pause the wiper at each end of the wipe pattern. For example, a single wiper on the rear window of the vehicle usually does not require a double sweep of the window between pauses. If a double sweep is not required, the wiper can be provided with a single unidirectional sweep between pauses to avoid sweeping back across an essentially dry window.

SUMMARY OF THE INVENTION

Therefore, this invention is a wiper control for a motor vehicle which controls an electric motor to drive the wiper through repeating cycles of the wipe pattern with a pause for a predetermined time period in both inner wipe and outer wipe positions at the ends of the wipe pattern in each cycle.

More particularly, the wiper control of this invention comprises a source of electric power, an electric drive circuit effective to drive the motor from the source of electric power when activated, a wiper activation switch having off, continuous and pause positions, a first wiper position responsive switch closed throughout the wipe pattern except for the inner and outer wipe positions, and a second wiper position responsive switch closed throughout the wipe pattern except for the inner wipe position.

The wiper control of this invention further comprises first circuit means connecting the first wiper position responsive switch in series with the electric power source to generate a signal to activate the electric drive circuit whenever the first wiper position responsive switch is closed, second circuit means including a timer effective, with the wiper activation switch in its pause position, to initiate activation of the electric drive circuit a predetermined time period after the first wiper position responsive switch opens, third circuit means effective with the wiper activation switch in its continuous position to provide continuous activation of the electric drive circuit, and fourth circuit means responsive to the wiper activation switch at least in its off position to connect the first wiper position responsive switch in parallel with the second wiper position responsive switch.

The wiper is therefore paused at both ends of the wipe pattern when the wiper activation switch is in its pause position but is only parked in the inner wipe position when the wiper activation switch is moved to its off position and the first wiper position responsive switch shorts out the second at the outer wipe position.

An additional benefit of the invention is obtained when the timer comprises a capacitor charged through a pause time determining resistance. For the same total pause time per complete cycle, the pause time at each end of the wipe pattern may be cut in half compared to the pause time that would be required for a pause at only one end of the wipe pattern. This allows either a decrease in capacitor size for a cost saving or a decrease in resistor size or an increase in charging current which has potential for improving connection and/or contact reliability.

SUMMARY OF THE DRAWINGS

The single drawing shows a circuit diagram of a preferred embodiment of a wiper control according to this invention.

DESCRIPTION OF THE PREFERRED EMBODIMENT

A wiper 10 is driven by an electric motor 11 through a mechanical drive 12 across a vehicle window 13. In this embodiment, window 13 may be the rear window of a motor vehicle; and mechanical drive 12 provides reversal of wiper motion at each end of a wipe pattern while motor 11 runs continuously in a single direction. Clearly, however, the invention would also apply to other embodiments, wherein a different window is wiped and/or the wiper reversal is provided by a reversing motor arrangement.

Electric motor 11 is a three brush, permanent magnet motor of the type well known in wiper circuits, with a grounded common brush 15, a high speed brush 16 and a low speed brush 17 connected to the armature 18 of a relay having an activating coil 20. In its inactivated position, armature 18 connects low speed brush 17 to ground for dynamic braking of motor 11. In its activated position, armature 18 is connected through a diode 21 to an electric power source having a supply voltage B+ relative to ground.

Relay 18, 20 is part of an electric drive circuit effective, when activated, to power motor 17 to drive wiper 10 across window 13. The electric drive circuit further includes a Darlington NPN transistor 22 having a collector connected to one end of coil 20, a grounded emitter, and a base connected through a biasing resistor 23 (402K) to ground. It further includes a PNP transistor 25 having an emitter connected to the one end of coil 20, a grounded collector and a base. The other end of coil 20 is connected to the electric power source B+ through a diode 26 to provide conduction therethrough and activation of armature 18 and motor 11 when either of transistors 22 and 25 is activated.

A double wiper position responsive switch assembly comprises an electrically conducting plate 27 of generally circular configuration that is mechanically keyed to wiper 10 to rotate with wiper movement and has openings 28 and 30 of a non-conducting material. Opening 28 extends inward from the periphery of plate 28 most but not all the way to the center thereof. Opening 30 is formed substantially opposite opening 28 and is open only in the radial middle between the center and periphery of plate 27. Plate 27 may actually be an insulating plastic or similar non-conducting circuit board coated with copper or a similar conducting material except for openings 28 and 30. Three stationary spring contacts 31, 32 and 33 are biased against plate 27 for physical and electrical contact therewith and trace paths of differing radius on plate 27 as it rotates. Contact 31 contacts plate 27 near its center and never breaks contact, since neither of openings 28 and 30 extends into the center of plate 27. Contact 32 is placed radially outward of contact 31 and breaks contact with plate 27 with opening 28 at an inner wipe position of wiper 10 and with opening 30 at an outer wipe position of wiper 10.

Contact 33 is placed radially outward of contact 32 and breaks contact with plate 27 only with opening 28 at the outer wipe position. The inner wipe position is arranged to be at one end of the wipe pattern on window 13 where the parking of wiper 10 is desired; and the outer wipe position is arranged to be at the opposite end of the wipe pattern.

Contact 31 is connected through the armature of a permanent magnet DC washer motor 35 to ground. Since the armature resistance of motor 35 is very small compared with other resistances in the circuit, plate 27 is thus effectively grounded. Contact 32 and plate 27 together form a first wiper position responsive switch which is closed throughout the wipe pattern of wiper 10 except for the inner wipe and outer wipe positions of wiper 10. Contact 32 is connected through a resistor 36 (47K) to electric power source B+ and through a resistor 37 (56 ohms) to the base of transistor 25. Closure of the first wiper position responsive switch 27, 32 provides a ground path for current from the base of transistor 25 to cause its activation.

Contact 33 and plate 27 together form a second wiper position responsive switch which is closed throughout the wipe pattern of wiper 10 except at the inner wipe position. Contact 33 is connected through the armature 38 of a relay to contact 32 when the relay is not activated by an activating coil 40. When coil 40 activates armature 38, the connection between contacts 32 and 33 is broken. As will be more completely described below, coil 40 is only caused to activate armature 38 when pause operation of the wiper is desired. Thus, during pause operation of the wiper, the first wiper position responsive switch 27, 32 is effective to break the ground connection of contact 32 at both the inner and outer wipe positions. In other modes of wiper operation, when relay armature 38 is not activated, the first wiper position responsive switch is shorted out by the second wiper position responsive switch 27, 33 at the outer wipe position of wiper 10. These modes include the off mode, with the result that the wiper will never park in the outer wipe position.

A wiper activating switch 41 comprises a sliding contact 42 which can be placed in any of several positions. In an OFF position it does not contact any stationary contacts. Sliding contact 42 may be moved in one direction from its OFF position to a PULSE position, in which it contacts a stationary contact 43 connected to electric power source B+, a stationary contact 45 connected through activating coil 40 to ground to activate armature 38, and to a stationary contact 46 connected through a variable resistor 47 to a multiplex junction 48 connected through a capacitor 50 (0.001 μF) to ground. Between its OFF and PULSE positions, sliding contact 42 briefly contacts a stationary contact 51, which does not extend to either of the OFF or PULSE positions, to initiate an instant wipe in pulse operation in a manner to be described below. Contact 51 is connected to multiplex junction 48 through a resistor 52 (680 ohms).

Sliding contact 42 may be moved from the PULSE position to a LO position, for low speed continuous wiper operation, in which it contacts stationary contact 43, already described, and a stationary contact 53 connected to multiplex junction 48 through resistor 52. It may further be moved to a HI position, for continuous high speed wiper operation, in which it contacts stationary contacts 43 and 53 and a further stationary contact 55 connected to high speed brush 16 of motor 11. Finally, from the OFF position, sliding contact 42 may be moved to a MIST position in which it contacts a stationary contact 56 connected to electric power source B+ and a stationary contact 57 connected through resistor 52 to multiplex junction 48. Sliding contact 42 is biased from the MIST position to the OFF position by mechanical biasing means not shown, since the MIST position is designed to provide a single wipe cycle of wiper 10.

High speed motor operation is obtained with motor 11 powered directly through the wiper activating switch in its HI position. The other modes of operation, however, are obtained by activation of the electric drive means described above in accordance with the voltage at multiplex junction 48. Multiplex junction 48 is connected through a resistor 58 (1K) and diode 60 in series to the base of Darlington transistor 22. A capacitor 61 (330 μF) is connected from the junction of resistor 58 and diode 60 to ground. A diode 62 connects multiplex junction 48 to contact 32 of the first wiper position responsive switch and to relay armature 38. Capacitor 61 is the capacitive portion of an RC timer which is charged through resistors 58 and 47 from electric power source B+ when the wiper activating switch is in its PULSE position and multiplex junction 48 is not grounded through either of the wiper position responsive switches.

Multiplex junction 48 is also connected through a resistor 63 (47K) and resistor 65 (1M) in series to ground, with the junction of resistors 63 and 65 connected to the base of an NPN Darlington transistor 6 having an emitter connected through a diode 67 to contact 32 and a collector connected through a resistor 68 (75 ohms) to the junction of diode 26 and coil 20. The emitter of transistor 66 is further connected through a capacitor 70 (22 μF) and resistor 71 (75K) in parallel to ground and through a resistor 72 (75K) and diode 73 in series to the base of transistor 22.

In operation, when sliding contact 42 connects either of the B+ connected contacts 43 or 56 to one of the contacts 51, 53 or 57 connected through resistor 52 to multiplex junction 48, that junction will be at a voltage high enough to turn on transistor 66. Transistor 66, once turned on, quickly charges capacitor 70 and turns on transistor 22 to activate motor 11 at low speed. Thus, movement of wiper activating switch 41 from its OFF position in one direction to its MIST position or in the other direction past the instant wipe contact 51 will initiate wiper operation at low speed. Immediately after the initiation of low speed operation of motor 11, plate 27 will turn far enough to close contacts 32 and 33, whereupon transistor 25 will be activated to take over the activation of motor 11 through relay armature 18. In addition, with contacts 32 and 33 grounded through plate 27, the emitter current of transistor 66 is shunted to ground and capacitor 61 is prevented from charging. Motor 11 will drive wiper 10 across window 13 to the outer wipe position.

When wiper 10 reaches the outer wipe position, contact 32 reaches opening 30 and is no longer grounded. At this point the operation of the circuit depends on the position of wiper activating switch 41. In the OFF or LO positions, or if it is still being held by the operator in the MIST position, wiper activating switch 41 does not activate relay armature 38; and the ungrounded contact 32 is shunted by the grounded contact 33 and armature 38 so that motor 11 continues to be driven. Mechanical drive 12 reverses the direction of wiper movement so that wiper 10 is driven back from the outer wipe position to the inner wipe position.

If, on the other hand, wiper activating switch 41 is in its PULSE position, armature 38 is activated and ungrounded contact 32 at the outer wipe position of wiper 10 is not shunted by contact 33. Therefore, transistor 25 turns off, armature 18 is deactivated to its grounded position, and motor 11 is dynamically braked to a halt in the outer wipe position of wiper 10. Capacitor 61 charges through resistors 47 and 58 until its voltage is high enough to turn on transistor 22. The time period is determined by the RC time constant of the timer, which is variable by the adjustment of variable resistor 47. When transistor 22 turns on, relay armature 18 is once again activated to power motor 11, whereupon wiper 10 is driven back from the outer wipe position to the inner wipe position after a predetermined pause time period.

When wiper 10 returns to its inner wipe position, both contacts 32 and 33 reach opening 28 and become ungrounded. At this point, with wiper activating switch 41 in its PULSE position, the motor stops and the timer action of capacitor 61 with resistors 47 and 58 provides another pause for the predetermined time. With wiper activating switch 41 in its LO or MIST position, transistor 25 turns off as contacts 32 and 33 become ungrounded. However, the ungrounding of contacts 32 and 33 allows transistor 66 to turn on once again, with the high voltage on multiplex junction 48; and this turns on transistor 22 before armature 18 has a chance to disconnect from electric power source B+. Thus, continuous wiper movement is provided at low speed.

A benefit of the invention on the circuit level is the lowering of the required time constant of the pause timer comprising capacitor 61 and resistors 47 and 58. Since a given water removal rate in pause operation implies a particular total pause time per wipe cycle, the pause time is effectively divided in half when the wiper is paused at each end of the wipe pattern. Since the pause time is cut in half for each charging of capacitor 61, then the RC time constant may be cut in half. This may be obtained in either of two advantageous ways. The capacitance of capacitor 61 may be halved to obtain size and cost reduction of the capacitor. Alternatively, the size of the resistor may be cut in half t obtain higher charging currents with the potential for improving connection and/or contact reliability.

Additional circuitry may optionally be provided for window washing. An open biased push button wash switch 75 is connected between electric power source B+ and multiplex junction 48 with no series resistance within switch 41. When washer switch 75 is closed, voltage B+ is provided to multiplex junction 48, which causes immediate activation of the wiper in low speed continuous operation just as if sliding contact 42 had been placed in the LO or MIST position. However, in the LO and MIST positions, the 680 ohms of resistor 52, while small compared to most other resistors in the circuit, is large compared to the armature resistance of washer motor 35; and the latter is thus not activated. With washer switch 75 closed, however, washer motor 35 is connected essentially across the electric power source with no significant series resistance and is thus activated to operate the washer pump and apply washer fluid on the window as long as switches 75 and 27, 33 remain closed.

An additional circuit provides extra drying wipes of wiper 10 when switch 75 is released. Contact 31 is connected through a diode 76, resistor 77 (750K) and diode 78 in series to the base of transistor 22. From the junction of diode 76 and resistor 77, a capacitor 80 (33 $\mu$F) is connected to ground and a resistor 81 (75K) and diode 82 are connected in series to contact 32. Finally, a capacitor 83 (0.001 $\mu$F) and resistor 85 (100 ohms) are connected in parallel to ground from contact 31. When switch 75 is closed, capacitor 80 is quickly charged through the wiper position responsive switches. When switch 75 opens, capacitor 80 is blocked by diode 76 from discharging back through the position responsive switches and thus continues to provide an activating signal on the base of transistor 22 for a time period after washer motor 35 stops operating. Most of the discharge current flows through resistor 81, which is less than one tenth the size of resistors 77 and 23 in series, and thus through the wiper position responsive switches. Thus it is highly likely that capacitor 80 will finally reach a voltage sufficiently low as to no longer provide the activating signal to transistor 22 during a sweep of wiper 10 when the wiper position responsive switches are closed and conducting discharge current. With little chance of this occurring with wiper 10 already in the inner wipe position, wiper 10 will therefore be parked accurately by the circuit as designed.

The embodiments of the invention in which an exclusive property or privilege is claimed are defined as follows:

1. A control for a wiper adapted to be driven back and forth in repeating cycles of a wipe pattern between inner wipe and outer wipe positions across a vehicle window by an electric motor, the control comprising, in combination:

a source of electric power;

an electric drive circuit effective to drive the motor from the source of electric power when activated;

a wiper activation switch having off, continuous and pause positions;

a first wiper position responsive switch closed throughout the wipe pattern except for the inner and outer wipe positions;

a second wiper position responsive switch closed throughout the wipe pattern except for the inner wipe position;

first circuit means connecting the first wiper position responsive switch in series with the electric power source to generate a signal to activate the electric drive circuit whenever the first wiper position responsive switch is closed;

second circuit means including a timer effective, with the wiper activation switch in its pause position, to initiate activation of the electric drive circuit a predetermined time period after the first wiper position responsive switch opens, whereby the wiper is driven through repeating cycles of the wipe pattern with stops for the predetermined time period at both the inner and outer wipe positions of the wipe pattern in each cycle;

third circuit means effective with the wiper activation switch in its continuous position to provide continuous activation of the electric drive circuit; and fourth circuit means responsive to the wiper activation switch at least in its off position to connect the first wiper position responsive switch in parallel with the second wiper position responsive switch to shunt the same at the outer wipe position, whereby the wiper will be parked only in the inner wipe position.

2. The wiper control of claim 1 in which the timer of the second circuit means comprises a capacitor connected to be charged by the electric power source through a resistor, the capacitor and resistor together having an RC time constant which is only half the RC time constant that would be required if the total pause time duration per cycle were accumulated at the inner wipe position.

3. The wiper control of claim 1 further comprising an electrically conducting plate mechanically keyed to the wiper for movement therewith and first and second stationary contacts biased into electrical contact with the plate and tracing first and second paths across the plate with wiper movement, the plate having means to break electrical contact with the first stationary contact with the wiper in the inner and outer wipe positions and means to break electrical contact with the second stationary contact with the wiper in the inner wipe position, the plate and first stationary contact together forming the first wiper position responsive switch and the plate and second stationary contact together forming the second wiper position responsive switch.

4. The wiper control of claim 3 in which the plate is essentially circular and driven rotationally with wiper movement, the first stationary contact traces a circular path on the plate at a first radius, the second stationary contact traces a second circular path on the plate at a second radius larger than the first radius, and the plate is provided with non-conducting portions across the first and second radius at the inner wipe position and across the first radius only at the outer wipe position for electrical contact breaking, the control further comprising a third stationary contact at a third radius different from the first and second radii which is always in electrical contact with the plate and forms a connecting terminal for the plate.

5. The wiper control of claim 4 in which the fourth circuit means comprises a relay with an armature normally connecting the first and second stationary contacts but being activatable to break the connection by an activating coil the electric power source with the wiper activation switch in its pause position.

* * * * *